United States Patent

Schor

[15] 3,702,422

[45] Nov. 7, 1972

[54] FILTERS FOR INTERCONNECTION SYSTEMS

[72] Inventor: Ferdinand William Schor, Altadena, Calif.

[73] Assignee: AMP Incorporated, Harrisburg, Pa.

[22] Filed: June 10, 1971

[21] Appl. No.: 151,788

[52] U.S. Cl. ...............317/101 CC, 317/257, 333/79

[51] Int. Cl. ..............................................H05k 1/04

[58] Field of Search....333/79; 317/101 CC, 101 DH, 317/237; 339/143 R, 14 R; 174/DIG. 3

[56] References Cited

UNITED STATES PATENTS

| | | | |
|---|---|---|---|
| 3,181,044 | 4/1965 | Duncan | 317/257 X |
| 3,325,766 | 6/1967 | Kolb et al. | 174/DIG. 3 |
| 2,667,573 | 1/1954 | Satinoff | 317/257 X |
| 3,165,672 | 1/1965 | Gellert | 317/101 CC |
| 3,435,387 | 3/1969 | Reinke et al | 333/79 |
| 3,345,622 | 10/1967 | Matsushita | 317/101 CC |
| 3,368,117 | 2/1968 | Pond et al. | 317/101 DH |
| 3,166,372 | 1/1965 | Just | 339/143 R |

*Primary Examiner*—David Smith, Jr.
*Attorney*—William J. Keating, Ronald D. Grefe, Gerald K. Kita, Frederick W. Raring, Jay L. Seitchik, John R. Flanagan and Allan B. Osborne

[57] ABSTRACT

An interconnection system configuration which is used between a printed circuit board and wiring board circuitry and which uses low-pass filters to reduce high frequency interference. The filters are positioned over terminal posts and uniquely grounded to the panel of an interconnection system.

9 Claims, 7 Drawing Figures

FILTERS FOR INTERCONNECTION SYSTEMS

BACKGROUND OF THE INVENTION

The present invention relates to electrical connectors wherein one or more contact terminals are assembled into one connector member to provide one or more electrical circuits upon engagement of these members. The invention relates more particularly to such an electrical connector wherein one or more RF filter assemblies comprising capacitive inductive and/or lossy circuit elements are electrically connected to the contact terminals of the connector member so as to attenuate the undesired RF signals which would otherwise pass through the connector.

Application Ser. No. 883,501, filed Dec. 8, 1969, discloses a low pass filter comprising a coating of barium titanate applied to a ferrite substrate and is of the general type contemplated for use in the present invention. Filters of a similar type have been previously used with devices such as the connector disclosed in my U.S. Pat No. 3,447,104.

Until recently, electrical connectors were used as discrete components with contact terminals for engaging a mating member of similar construction. With the development and usage of large and small printed circuit boards, wiring boards and automatic wiring systems, it has become practical to assemble mating contacts to these members so that electrical connectors as such are not always required.

For example, a large wiring board may contain hundreds of contact pins mounted at right angles to and passing through the board. Dozens of small PC boards containing components plug into one side of the wiring board while the other side contains a mass of interconnection wiring plus mating contacts for connection to the remainder of the equipment. Such a multitude of mating contacts and wiring constitutes an interconnecting system.

Where PC boards contain sources of high frequency interference such as oscillators, SCR rectifiers, pulse circuits, and high voltage diodes, it is likely that the interference will propagate through the system terminals along the circuitry of the wiring board to the other PC boards. Such high frequency interferences appearing on other PC boards containing sensitive circuits could result in the malfunctioning of the entire equipment.

SUMMARY OF THE INVENTION

Accordingly, it is one of the objects of the invention to provide means of preventing high frequency interference which originates in PC boards from propagating through interconnection system terminals and along the circuitry of the wiring board to other PC boards.

It is another object of the present invention to provide a wiring board with self-contained low-pass filters for the purpose of reducing high frequency interference between the PC boards mounted thereon and also between the PC boards and the remainder of the equipment.

It is still another object of the present invention to provide filtering between the components of the wiring board and other portions of the equipment in the system connected to the wiring board through its interconnection terminals.

It is a further object of the present invention to provide a filter construction for an interconnection system requiring no tooling changes in the interconnection terminals.

It is still a further object of the present invention to provide filtering between any individual pairs of terminals of an interconnection system with or without connection to a ground plane.

It is still another object of the present invention to provide a means to facilitate the replacement of a filter in an interconnection system without the use of solder connections.

Still another object of the present invention is to provide means to insert a filter in a new location within an interconnection system with a minimum effort.

Yet another object of the present invention is to provide means of reducing intercircuitry cross-talk which is frequently inherent in such systems.

DESCRIPTION OF THE PREFERRED EMBODIMENT

Figure 1:
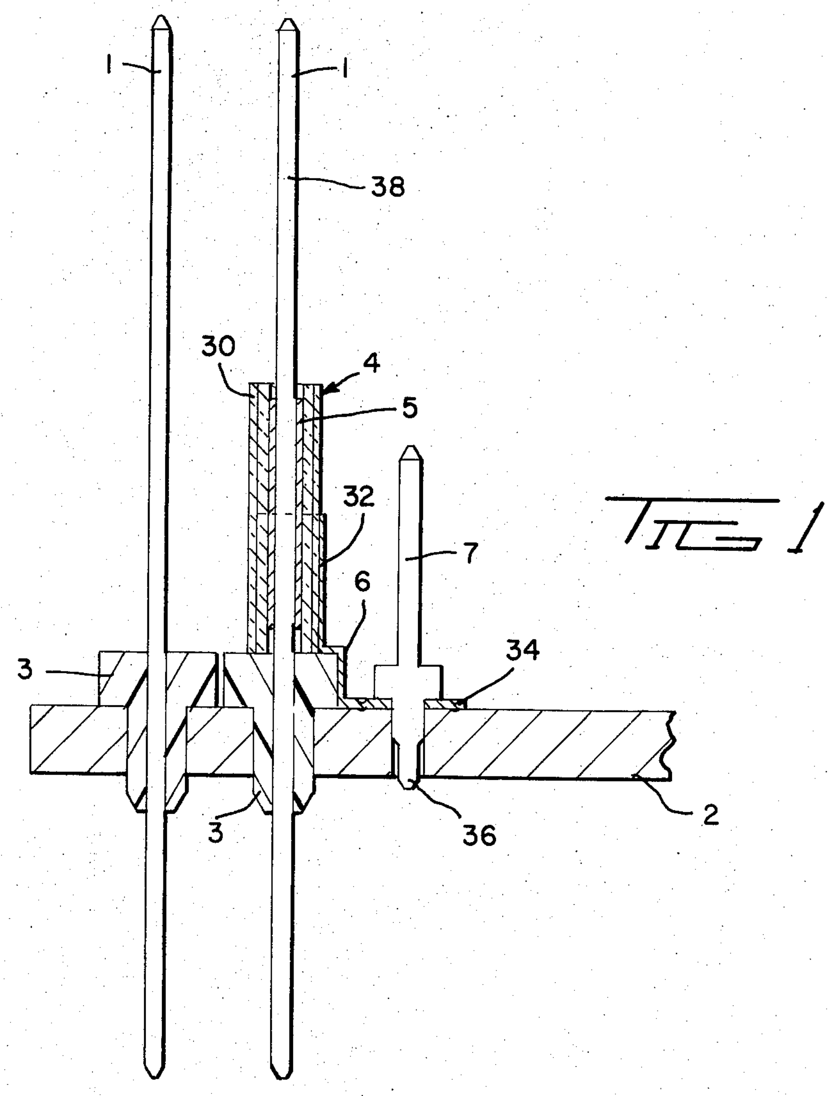
FIG. 1 is a plan view showing a filter assembled to a terminal post of an interconnection system.

FIG. 1 shows a portion of an interconnection system in which the terminal post 1 is mounted to an aluminum panel 2 by means of a sleeve configuration nylon insulator 3. A low-pass filter 4 which in in the form of an extended ferrite tube covered with an insulating material having a high dielectric constant such as barium titanate compound and which has an outer metallic surface 30, threads over post 1 and makes contact between its inner surface and the post by means of barrel spring 5.

Figure 2:
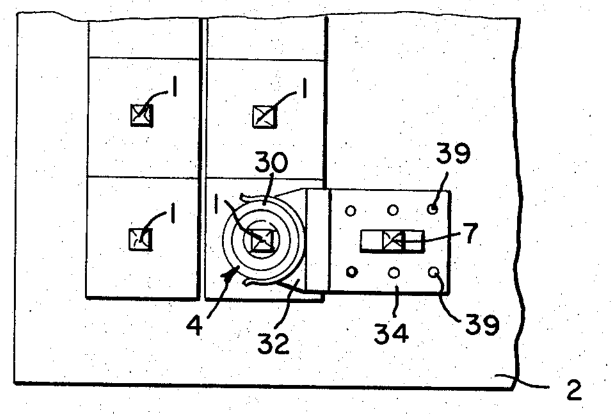
FIG. 2 is a top view of FIG. 1.

The outer metallic surface 30 of the filter makes peripheral contact with one end 32 of ground strap 6 which bridges between the filter and the panel 2 and is made of a conducting spring material suitably plated. This may be a heat treated beryllium copper spring material with a nickel and gold finish. As shown in FIG. 2, one end of the ground strap 6 is folded into a seam-free configuration in conformity with and resiliently engaged on the outer metallic surface 30 of the filter 4. The other end 34 of the ground strap 6 is conductively attached to the aluminum panel 2 with ground strap attachment pin 7. Pin 7 is driven into a force-fit hole 36 under heavy pressure so that perfect contact is maintained under all conditions. The upper portion 38 of post 1 protrudes from the filter 4 received thereover and is available for automatic wiring using wire wrapping techniques. RF interference entering or leaving thru terminal post 1 is thus greatly reduced by the action of filter 4.

The filter 4 may be easily replaced by sliding it up on post 1 and sliding a new one down the post until it engages the ground strap 6.

Referring to FIG. 2, a top view of the connection can be seen. Pin pricks 39 in the ground strap 6 provide detents which penetrate through the anodized finished of the panel 2 when pin 7 is driven into panel 2. This establishes good contact between the ground strap 6 and the panel 2.

Figure 3:
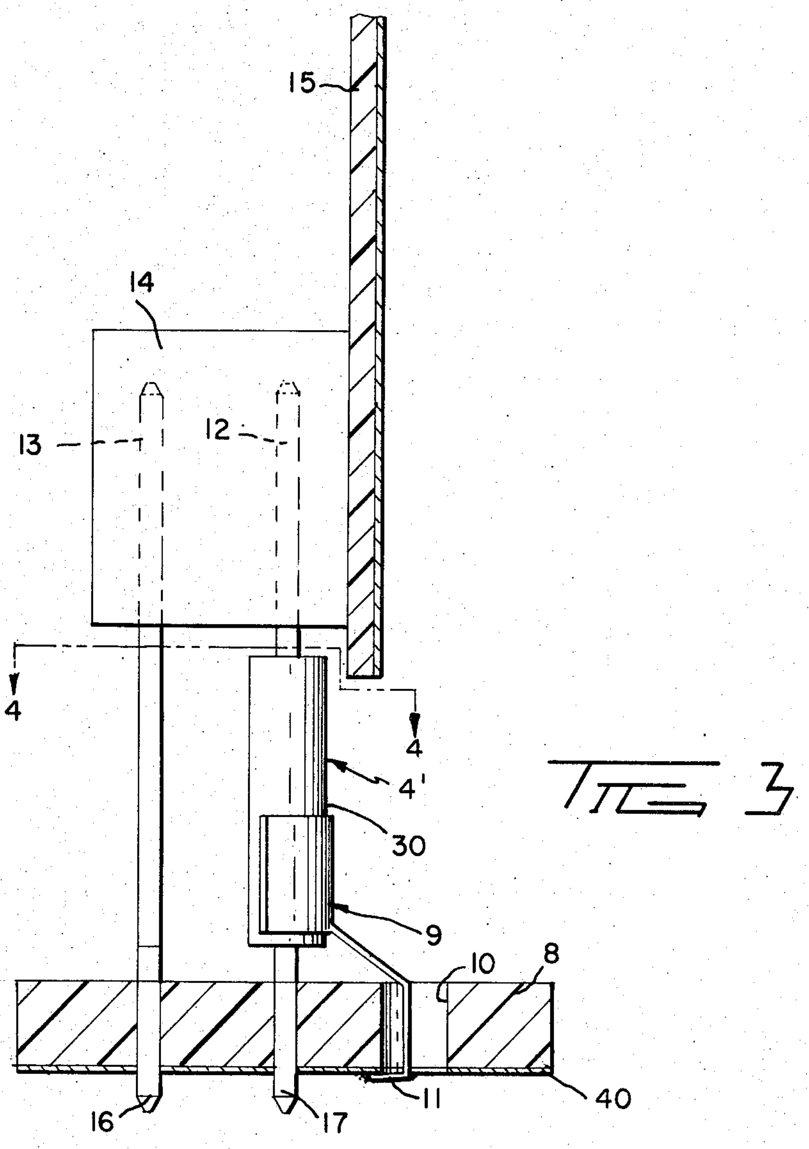
FIG. 3 is a plan view showing a filter mounted on a post attached to a plastic wiring board using printed circuit wiring.

FIG. 3 shows a filter 4' mounted on a post 12 attached to a plastic panel or wiring board 8. The bottom surface 40 of this board is covered with printed circuit wiring. Ground strap 9 which contacts the outer surface 30 of the filter 4' extends down thru a hole 10 and is bent over to form ground strap bridges between the filter and the board or panel solder lug 11. The ground strap is soldered by a solder joint to the PC ground circuit when solder is applied to the under surface of wiring board 8.

The upper ends of the posts 12 and 13 plus as many additional pairs of posts in the same row as required, are made long enough to engage receptacle 14 which is attached to PC board 15. Note that the bottom tip of the posts contact appropriate parts of the printed circuitry on the underside of wiring board 8.

Filter 4' is thus positioned to attenuate RF interference generated on PC board 15 and prevent it from feeding into wiring board 8. It also keeps high frequency interference picked up by the remainder of the equipment from feeding into PC board 15 which may contain circuits sensitive to such interference. Portions of the terminal posts 16 and 17 may extend well beyond (not shown) the bottom surface of wiring board 8 to provide for interpost wiring. This may be done by automatic machinery using wire wrapping techniques or hand soldering. The filter action will remain the same.

Figure 4:
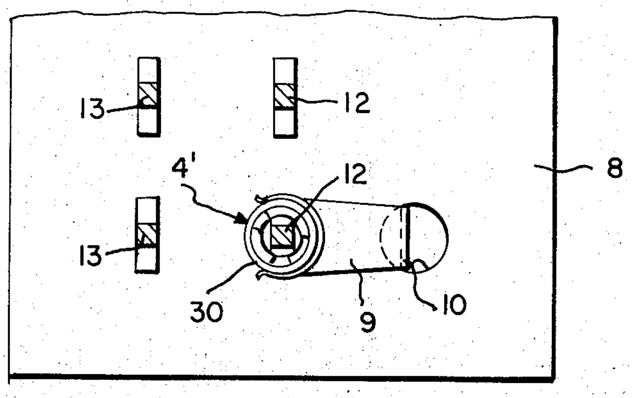
FIG. 4 is a view along 4 — 4 of FIG. 3.

FIG. 4 shows a top view of the ground strap fitting with the PC board and receptacle removed.

Figures 5, 7:
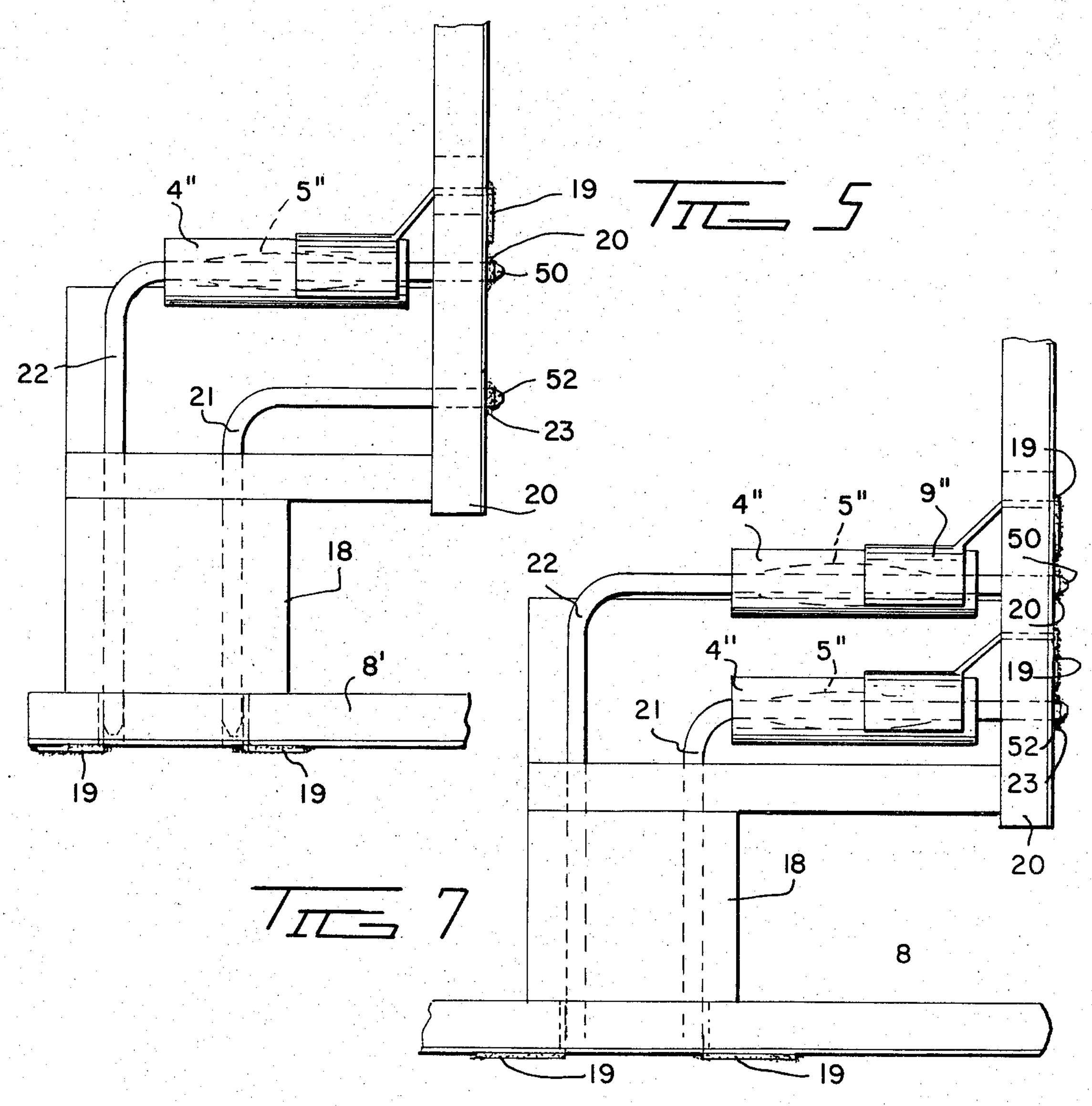
FIG. 5 is a plan view showing a filter mounted on a right angle post of the upper row of posts which are soldered to a PC board.
FIG. 7 is similar to FIG. 5 except filters are mounted on both rows of posts.

FIG. 5 describes a type of interconnection system in which a receptacle 18 is attached to wiring board 8 by means of receptacle solder lugs 19. To permit a PC board 20 to plug into wiring board 8 in a right angle position as shown, terminal posts 21 and 22 are bent at right angle as shown. These are soldered to the printed circuitry of PC board 20 at points 23 and 24.

Where a filter is only required on the upper row 50 of posts, and not on the low row 52, only a slight lengthening of these posts is required as shown in FIG. 5. The filter 4'', barrel spring 5'' and ground strap 9' are positioned on the PC board 20 in a manner similar to the positioning on the wiring board 8 shown in FIG. 2.

Figure 6:
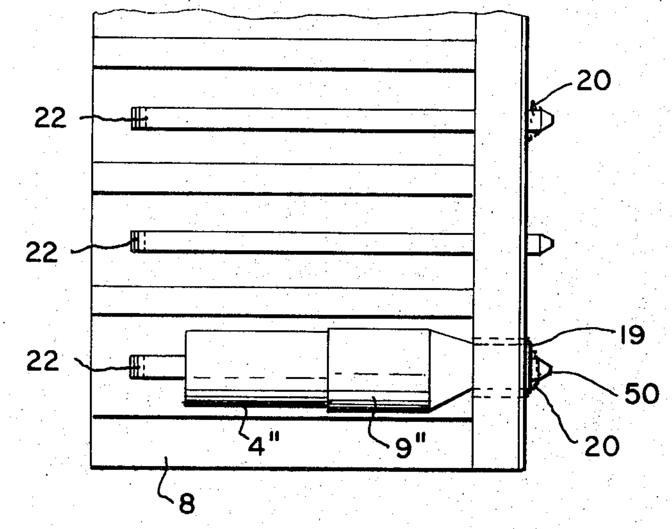
FIG. 6 is a top view of FIG. 5.

FIG. 6 shows the top view of ground strap 9' used in FIG. 5.

Where filters are required on both upper 50 and lower 52 rows, the posts 21 and 22 must be extended horizontally as shown in FIG. 7.

The action of the filters is again the same as described previously, that is, they help keep generated interference in the PC board from entering the wiring board circuitry and also reduce interference picked up or generated by the remaining equipment which could enter the PC board circuitry through the above-described terminal posts.

The filter also reduces intercircuitry cross-talk by reason of their increased capacity to the ground plane or ground potential circuits.

As can be seen in the above-embodiments, the addition of the filters can be accomplished without tooling changes in the interconnection terminals. The filters may be inserted and removed with ease and the lack of solder connections facilitates their replacement.

While various embodiments of the invention have been shown and described, it will be understood that various modifications may be made. The appended claims are, therefore, intended to define the true scope of the invention.

What is claimed is:

1. An interconnection system for a panel, comprising: a panel, a terminal post of conducting material mounted in said panel, said post including a protruding portion extending externally of said panel, said panel including insulation means of insulation material encircling said post and supporting said post within said panel, a filter received over and in electrical contact with said protruding portion of said post, said filter being carried by said protruding portion of said post entirely externally of said panel, said filter including a conducting outer surface, a conducting strap of spring material having a first portion folded in conformity with said conducting outer surface of said filter and resiliently engaging said conducting outer surface for electrical contact therewith, said strap including a second portion bridging between said filter and said panel, said panel including electrical conducting means, and fastening means receiving said second portion of said strap fixedly to said electrical conducting means of said panel.

2. The structure as recited in claim 1, wherein, said insulation means includes an insulator sleeve having a portion received in said panel and having a portion interposed between said panel and said filter.

3. The structure as recited in claim 1, wherein, said insulation means comprises an integral portion of said panel, with said panel and said insulation means being of the same insulation material.

4. The structure as recited in claim 1, wherein, said insulation means includes an insulation sleeve received in said panel and interposed between said panel and said filter, said panel is fabricated of conducting material comprising said electrical conducting means, said second end portion of said strap overlies and engages said panel, and said fastening means is on conducting material and is driven into said second portion of said strap and said panel.

5. The structure as recited in claim 4, wherein, said second portion of said strap includes detent means driven into said panel by said fastening means pressing together said second portion of said strap and said panel.

6. The structure as recited in claim 1, wherein, said fastening means includes a pin driven into said second portion of said strap and into said panel.

7. The structure as recited in claim 1, wherein, said panel includes a conducting material thereon, and said fastening means connects said second portion of said strap to said conducting material.

8. The structure as recited in claim 7, wherein, said fastening means is a solder joint.

9. The structure as recited in claim 5, wherein, said panel is of aluminum with an anodized surface, said detent means pierces through said anodized surface for electrical contact with said aluminum.

* * * * *